US010281877B2

(12) United States Patent
Tagawa (10) Patent No.: US 10,281,877 B2
(45) Date of Patent: May 7, 2019

(54) DIGITAL HOLOGRAPHY DEVICE AND DIGITAL HOLOGRAM GENERATION METHOD

(71) Applicant: SHIMADZU CORPORATION, Kyoto (JP)

(72) Inventor: Yusuke Tagawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 30 days.

(21) Appl. No.: 15/529,538

(22) PCT Filed: Jul. 13, 2015

(86) PCT No.: PCT/JP2015/070019
§ 371 (c)(1),
(2) Date: May 25, 2017

(87) PCT Pub. No.: WO2016/084420
PCT Pub. Date: Jun. 2, 2016

(65) Prior Publication Data
US 2017/0329281 A1    Nov. 16, 2017

(30) Foreign Application Priority Data
Nov. 27, 2014  (JP) .................................. 2014-239506

(51) Int. Cl.
*G03H 1/00*    (2006.01)
*G03H 1/04*    (2006.01)
(Continued)

(52) U.S. Cl.
CPC ......... *G03H 1/0443* (2013.01); *G03H 1/0005* (2013.01); *G03H 1/0465* (2013.01);
(Continued)

(58) Field of Classification Search
None
See application file for complete search history.

(56) References Cited

U.S. PATENT DOCUMENTS 8,654,343 B2 *   2/2014   Awatsuji ............... G01B 9/021
                                                          356/495
2004/0213464 A1 * 10/2004  Hanson ................ G03H 1/0406
                                                          382/214
(Continued)

FOREIGN PATENT DOCUMENTS

JP     10-268740     9/1998
JP     2012-531584   12/2012
(Continued)

OTHER PUBLICATIONS

Carl et al., "Multiwavelength digital holography with autocalibration of phase shifts and artificial wavelengths", Optical Society of America, Applied Optics, vol. 48, No. 34, Dec. 1, 2009, pp. H1-H8. (Year: 2009).*

(Continued)

Primary Examiner — Reza Aghevli
(74) Attorney, Agent, or Firm — Andrew F. Young, Esq.; Lackenbach Siegel, LLP (57) ABSTRACT

A generation method of a digital hologram includes steps of emitting coherent light from a coherent light source, imaging a hologram that is an interference pattern of an object beam and a reference beam due to the emission light from the light source, and setting a plurality of wavelengths of the illumination light that generates the hologram detected by the detector, and wherein the plurality of wavelength are specified by the wavelength setting step based on a magnification percentage X of a conjugate image set up by a user not to disturb visibility of an image when a real image and the conjugate image reconstructed by a predetermined calculation means relative to structures of observation targets (Continued)

are superimposed to a corresponding real image so that a shortest wavelength $\lambda_{min}$ and a longest wavelength $\lambda_{max}$ satisfy the expression $\lambda_{max}/\lambda_{min} \geq (1/X+1)$.

3 Claims, 9 Drawing Sheets

(51) Int. Cl.
 *G03H 1/08* (2006.01)
 *G03H 1/26* (2006.01)

(52) U.S. Cl.
 CPC ..... *G03H 1/0866* (2013.01); *G03H 2001/005* (2013.01); *G03H 2001/0447* (2013.01); *G03H 2001/266* (2013.01); *G03H 2222/13* (2013.01); *G03H 2222/34* (2013.01); *G03H 2226/02* (2013.01)

(56) References Cited

U.S. PATENT DOCUMENTS

| | | | |
|---|---|---|---|
| 2013/0250383 A1* | 9/2013 | Mater | G03H 1/02 359/32 |
| 2014/0268105 A1 | 9/2014 | Bills | |
| 2015/0293498 A1* | 10/2015 | Picart | G03H 1/0011 348/40 |
| 2017/0031318 A1* | 2/2017 | Stahl | G03H 1/0443 |
| 2018/0046139 A1* | 2/2018 | Stahl | G01N 15/1404 |

FOREIGN PATENT DOCUMENTS

| | | | |
|---|---|---|---|
| WO | WO 2010092739 | 8/2010 | |
| WO | WO-2012136238 A1 * | 10/2012 | ........... G03H 1/0443 |

OTHER PUBLICATIONS

Memmolo et al., "Multi-wavelengths digital holography: reconstruction, synthesis and display of holograms using adaptive transformation," Optical Society of America, Optics Letters, vol. 37, No. 9, May 1, 2012, pp. 1445-1447. (Year: 2012).*
Cal et al., "Multiwavelength digital holography with autocalibration of phase shifts and artificial wavelengths," Optical Society of America, Applied OPtics, vol. 48, No. 34, Dec. 2009, pp. H1-H8. (Year: 2009).*
Li et al., "Digital holographic reconstruction of large objects using a convolution approach and adjustable magnification," Optical Society of America, Optics Letters, vol. 34, No. 5, Mar. 1, 2009, pp. 572-574. (Year: 2009).*
Khmaladze et al., "Quantitative Phase Contrast Imaging of Cells by Multi-Wavelength Digital Holography," Optical Society of America, 2007 Conf. on Lasers and Electro-Optics, Baltimore, MD, May 6-11, 2007, pp. 1-2. (Year: 2007).*
Yan Zhang, et al., "Whole optical wave field reconstruction from double or multi in-line holograms by phase retrieval algorithm", Van Zhang, Optic Express, The Optical Society of America, 2003, vol. 11,No. 24,pp. 3234-3241.
Peng Bao, et al., "Lensless phase microscopy using phase retrieval with multiple illumination wavelengths", Peng Bao, et al., Applied Optics, The Optical Society of America, Aug. 2012, vol. 51, No. 22, pp. 5486-5494.
Multi-wavelengths digital holograph; reconstruction, synthesis and display of holograms using adaptive transformation, P. Memmolo, et al., Optics Letters, vol. 37, No. 9, Optical Society of America, May 1, 2012, p. 1445-1447.
PCT/JP2015/070019, International Search Report and Written Opinion, dated Aug. 18, 2015, 2 pages—English, 6 pages—Japanese.
EP 15863320.6, Extended European Search Report dated Nov. 28, 2017, 11 pages—English.
Daniel Velaquez, et al.: "Multi-wavelength digital in-line holographic microscopy", May 2, 2102, pp. 1-3, XP055426827, Biomedical Optics and 3D Imaging OSA 2012.

* cited by examiner

DIGITAL HOLOGRAPHY DEVICE AND DIGITAL HOLOGRAM GENERATION METHOD

CROSS REFERENCE TO RELATED APPLICATIONS

This application relates to and claims § 371 priority from, Ser. No. PCT/JP2015/070019 filed Jul. 13, 2015 the entire contents of which are incorporated herein by reference, which in turn claims priority from JP Ser. No. 2014-239506 filed Nov. 27, 2014.

FIGURE SELECTED FOR PUBLICATION

Figure 2:
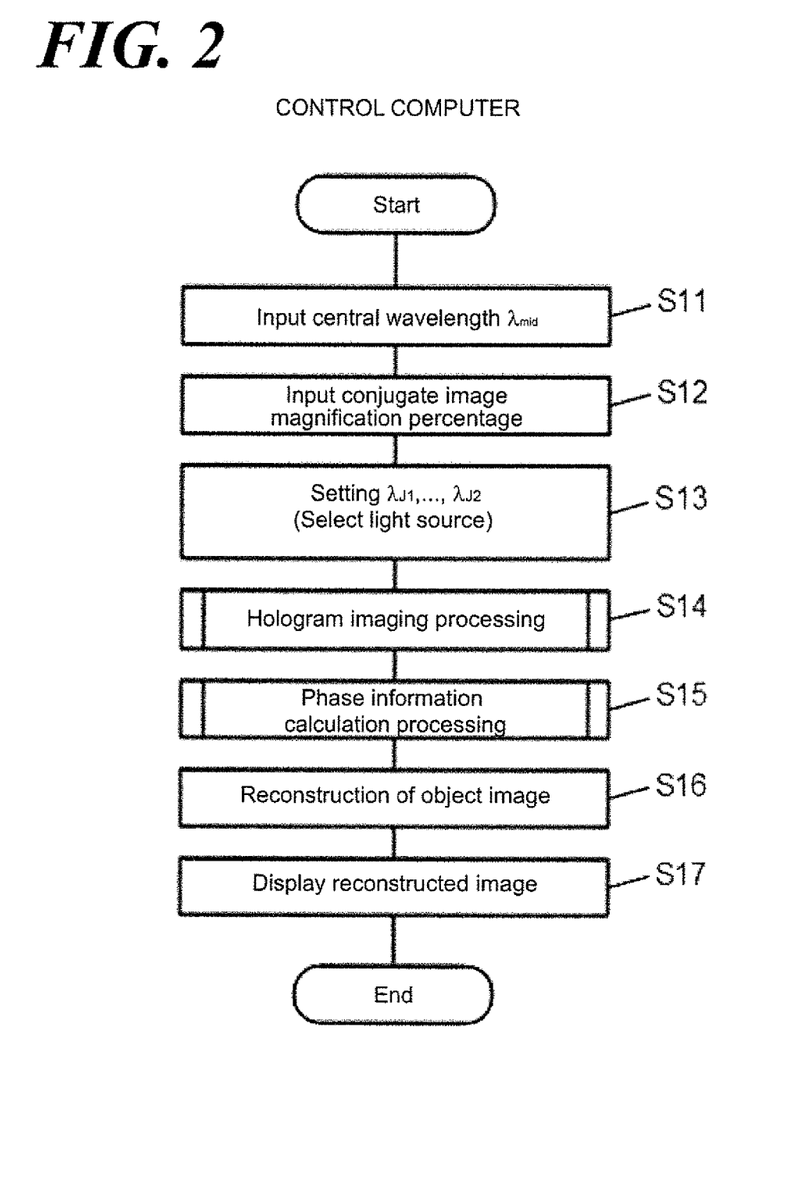
FIG. 2 is a flow-chart illustrating the processings performed by the measurement system referring to FIG. 1.

FIG. 2

BACKGROUND OF THE INVENTION

Field of the Invention

The present invention; relates to a digital holography device that calculates a reconstruction image of an object from a hologram recording an interference pattern between an object beam and a reference beam, and a generation method of digital hologram; and particularly relates to the digital holography device and the generation method of digital hologram therefrom utilizing an aspect to calculates a phase information from multiple recorded (stored in memory) holograms.

Description of the Related Art

The digital holography can provide a reconstruction image of an object by performing a predetermined arithmetic processing based on an interference pattern (hologram) that the object beam, which is the beam from the light source and reflected on the object plane or transmits the object and the reference beam, which is the direct light beam from the same light source. The hologram is an image denoting the intensity distribution of the interfering light and such intensity distribution is given based on the amplitude difference and the phase difference between the object beam and the reference beam, in which both are complex wavefronts.

However, the hologram cannot record a phase that is an imaginary part of the wave. Consequently, when the reconstruction image of the object is acquired based on the hologram, a false image (conjugate image) having a complex conjugate amplitude with the real image at the symmetrical position of the real image (expected reconstruction image) relative to the detection plane. When two images are superimposed, the visual recognition (visibility) of the real image decreases, so that a clear image of the observation target may not be obtained.

A variety of approaches to restore the phase (inference of the phase information) of the object beam has been applied to solve the above issue. For example, Patent Document 1 discloses an calculation method to the phase information using a linear operation by imaging a plurality of holograms in which the phase of the reference beam shifts. According to the method disclosed in Patent Document 1, however, an optical system including the piezoelectric element, the mirror, the lens and so forth is needed and consequently, the structure of the apparatus per se becomes complex and sizable.

On the other hand, non-Patent Document 1 reported that an in-line-type digital holography device was applicable to the method of phase restoration, in which no optical system was needed. According to the above method, multiple holograms having each different distance between the object and the detection plane are imaged as the object beam that is diffracted light with an object having a high optical transparency (e.g., cells) and the reference beam that is non-diffracted light transmitting such object. Subsequently, the phase information are calculated by repeatedly calculating the propagation and the reverse-propagation of the light wave between the object plane and the detection plane based on the imaged multiple holograms. Regardless, even if the above method, a driving mechanism (e.g., piezoelectric element and so forth) to shift the detector in a high degree of accuracy is still required.

In contrast, recently, the phase restoration method by repeat calculation of light wave propagation based on the hologram imaged using the respective wavelengths while changing the light wavelength of the light emitted from the light source in the multiple steps is proposed (non-Patent Document 2). According to the above method, the phase restoration can be achieved using the simple device system without requirement of a complex optical system and a driving system.

RELATED PRIOR ART DOCUMENTS

Patent Document

Patent Document 1: JP Patent Published 10-268740

Non-Patent Document

Non-Patent Document 1: Yan Zhang, et al., "Whole optical wave field reconstruction from double or multi in-line holograms by phase retrieval algorithm", Optic Express, The Optical Society of America, 2003, Vol. 11, No. 24, pp. 3234-3241.

Non-Patent Document 2: Peng Bao, et al., "Lensless phase microscopy using phase retrieval with multiple illumination wavelengths", Applied Optics, The Optical Society of America, 2012, Vol. 51, No. 22, pp. 5486-5494.

ASPECTS AND SUMMARY OF THE INVENTION

A digital hologram generation method comprises: a light emission step for emitting coherent light from a light source; an imaging step for capturing the image of a hologram as an interference fringe via a detector, the interference fringe being caused by interference between an object wave and a reference wave due to the emission light from the light source; and a wavelength setting step for setting a plurality of wavelengths of illumination light for generating the hologram captured by the detector. The plurality of wavelengths set in the wavelength setting step is established so that the real image and the conjugate image of a structure to be observed, which are reproduced via prescribed computation means, satisfy the following relationship: $\lambda_{max}/\lambda_{min} \geq (1/X+1)$ where $\lambda_{min}$ represents the shortest wavelength; $\lambda_{max}$ represents the longest wavelength; and X represents the magnification rate of the conjugate image set by a user to not obstruct the visibility of the corresponding real image when the conjugate image is superimposed on the real image.

Objects to be Solved

A biomicroscope, which is one of applications of digital holography technology, so far is mainly focused on being capable of observing the inside structure of a cell or a further extremely finer object. i.e., increasing the resolution.

In the regeneration medicine field in recent years, the researches applying an induced pluripotent stem cell (e.g., ES cells and iPS cells) are very active. In such researches, the culture state must be carefully monitored and double-checked because the high-quality cells must be cultured while sustaining such pluripotent property. For example, when defect (like flatting, adhering to the medium and differentiation to specific cells and so forth) takes place in some cells of a colony, such defect propagates to other cells and finally, all cells of the colony become defect. Accordingly, the observer must double-check everyday whether or not such defect has taken place, and if such defect appears, the defect must be removed. Although such double-check can be carried out using a microscope, cells per se are hardly recognizable by eyes optically, and even if a phase-contrast microscope is employed, it is still hard to decide an incident of the defect, so that such work imposes a heavy burden to the observer. Therefore, such work is being tried to be carried out automatically using a digital holography technology.

Such defect phenomenon taking place in the induced pluripotent stem cell culture is decided based on a relatively macro structure (i.e., a colony shape with volume including thickness) compared to the inside structure of cells. Now the inventor confirmed by computing that when the macro structure is observed applying the aspects of non-Patent Document 2, the above conjugate image is superimposed to the target area, so that the real image can be worsened to be recognized by eyes. Specifically, it is hard to say the structure of the non-Patent Document 2 is appropriate to decide whether or not the incident of defect in the induced pluripotent stem cell culture takes place.

In addition, even if the method described in non-Patent Document 2, a complete restoration of the phase is difficult and a superimposition of conjugate images in the in-line-type digital holography is hardly avoidable. The reason is that the value eligible for an unequivocal benchmark indicating the degree of phase restoration is not defined. According to non-Patent Document 2, a correlation coefficient of the estimated amplitude value between holograms due to a plurality of wavelengths is used as an evaluation benchmark for an approximate accuracy. For example, given the illumination light wavelengths is, however, almost identical when a plurality of holograms is imaged, the value of the correlation coefficient is large despite no phase restoration at all, so that it can be found that a good approximation is obtained. Accordingly, the correlation coefficient as the evaluation benchmark can be used as a rough indication of convergence of the repeated calculations, but such correlation coefficient is not accurate as the benchmark of the degree of accuracy for the phase restoration.

The present invention is intending to solve the above problems and a purpose of the present invention is to provide a digital holography device and a method of generation of a hologram capable of reconstructing a clear image relative to observation targets having a different size each other in accordance with the purpose thereof.

Means for Solving the Problem

Now, first, the inventor sets forth the outline of the method of improving a quality of the image of the observation target by a phase restoration of the object beam.

Figure 4:
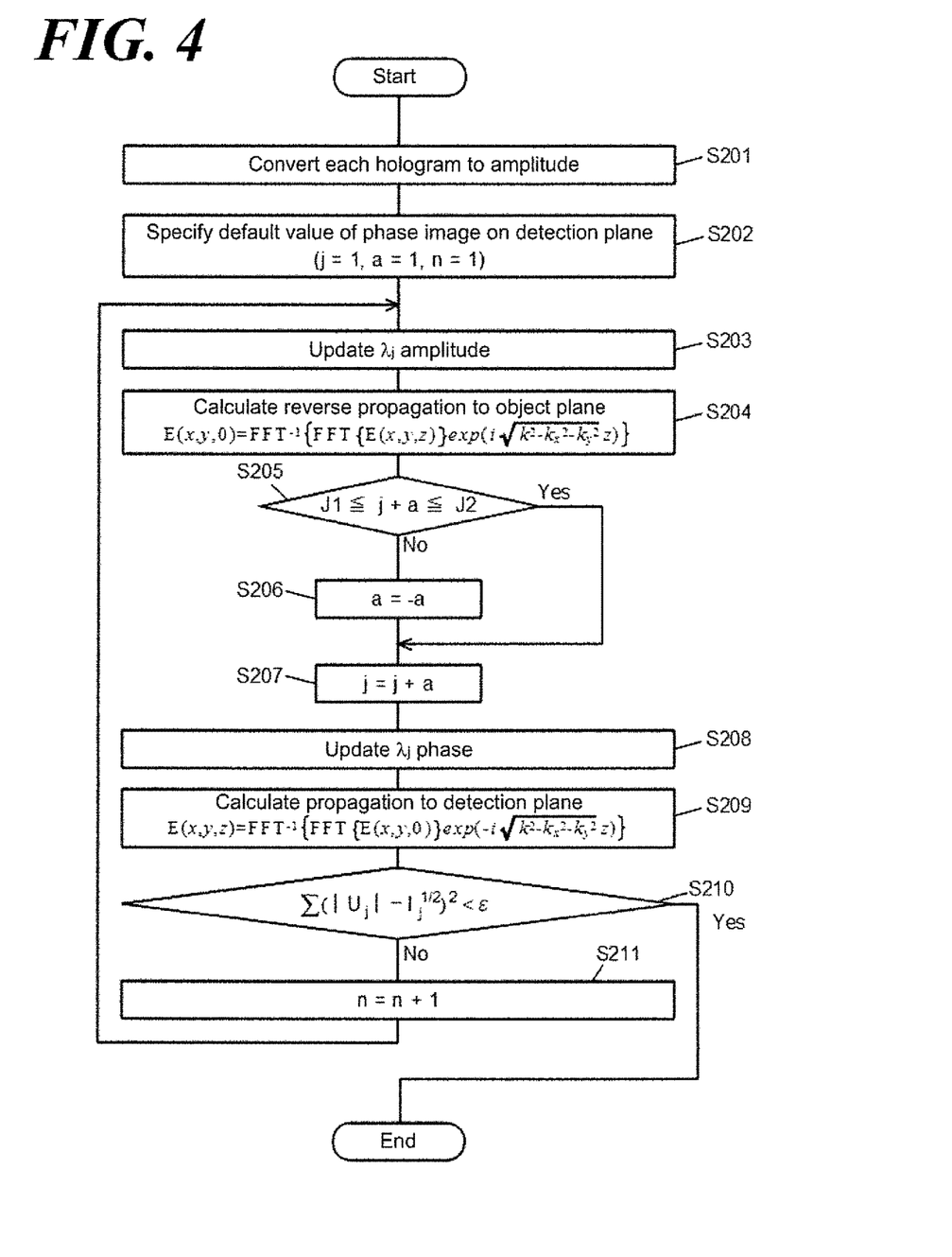
FIG. 4 is a flow-chart illustrating an example of the phase information calculation processing.

A phase information calculation processing is an algorithm to estimate the phase of object beam by a lightwave propagation calculation based on a plurality of the imaged holograms. Referring to FIG. 4, the inventor sets for an example. The detail of each step S5 is set forth later. In addition, the word "lightwave propagation" include both aspects of propagation and reverse propagation as set forth above unless otherwise specified particularly.

The Fresnel diffraction equation and the angular spectrum method and so forth are known to calculate the lightwave propagation and the calculation formula of the angular spectrum method is given as Mathematical Formula 1 below.

Mathematical Formula 1

$$E(x,y,0) = FFT^{-1}\{FFT[E(x,y,z)]\exp(i\sqrt{k^2 - k_x^2 - k_y^2}z)\} \quad (1)$$

E(x,y, 0) is complex amplitude distribution relative to the detection plane, E (x, y, z) is a complex amplitude distribution relative to the detection plane, and z is a propagation distance. In addition, K is a wavenumber.

The above mathematical formula 1 corresponds to that an object image, as a sum of the diffraction grating of a variety of pitches, can be obtained by a diffraction calculation. The diffraction angle φ of the incident light to the diffraction grating is given by the mathematical formula (2). λ is a wavelength and p is a pitch width of the grating.

Mathematical Formula 2

$$\Phi = \sin^{-1}\frac{\lambda}{p} \quad (2)$$

Figure 6:
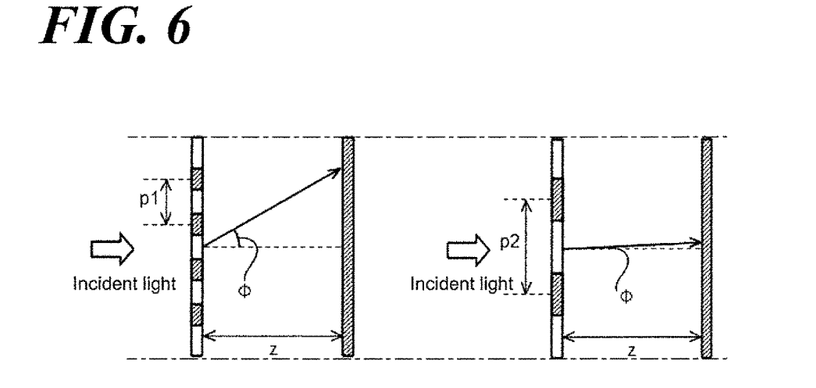
FIG. 6 is a schematic diagram illustrating the difference of the diffract angle of the incident light depending on the difference between pitch widths of the diffraction grating.

If p is smaller than the value given by the above mathematical formula (2), i.e., the pitch of the diffraction grating is fine (p=p1), the diffraction angle Φ is large, so that the wavefront (object beam) is largely expanding in the perpendicular direction relative to the detection plane (left side of FIG. 6). In contrast, if p is great, i.e., the pitch of the diffraction grating is rough (p=p2>p1), the diffraction angle Φ is small, so that the wavefront is slightly expanding in the perpendicular direction relative to the detection plane (right side of FIG. 6). Such behavior is the same as when the conjugate image reversely propagates from the detection plane to the wavefront.

In addition, in the FIGs referred in the specification of the present invention, a dimensional ratio of each member is arbitrarily modified for convenience of explanation and may be different from each actual dimensional ratio.

Now, the fineness of the diffraction pitches corresponds to the fineness of the structure in the image. Specifically, the fine structure (e.g., intracellular structure) in the image is deemed as a high-frequency grating having fine pitches and the large structure (e.g., a shape of the cell colony) is deemed as a low-frequency grating having rough pitches.

Figure 7A:
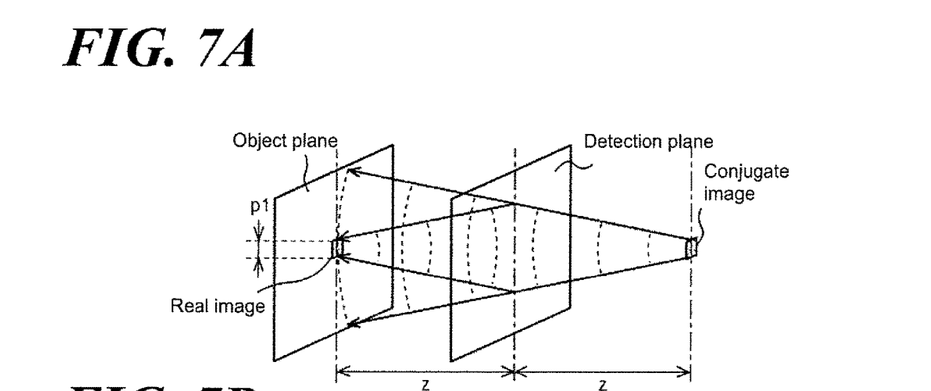
FIG. 7A is a schematic view illustrating a phenomenon in which a real image and a conjugate image reconstructed by a lightwave propagation calculation are superimposed to each other.
Figure 7B:
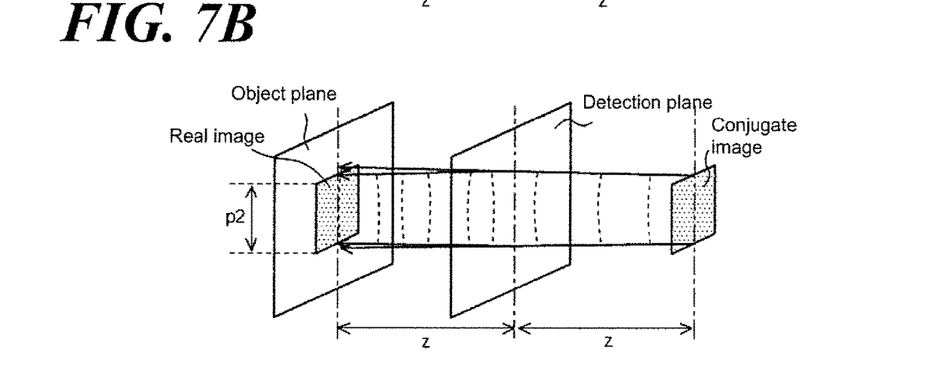
FIG. 7B is a schematic view illustrating a phenomenon in which a real image and a conjugate image reconstructed by a lightwave propagation calculation are superimposed to each other.

FIG. 7A, FIG. 7B are schematic views illustrating a phenomenon in which a real image and a conjugate image reconstructed by a lightwave propagation calculation are superimposed to each other. Referring to FIG. 7A, the conjugate image having a fine structure corresponding to the high-frequency grating expands (defocuses) largely while reversely propagating to the object plane, so that an effect on visibility of the superimposed real image on the object plane can be minor. In contrast, referring to FIG. 7B, the conjugate image having a large structure corresponding to the low-frequency grating expands slightly, so that the lightwave can reaches to the object plane while keeping almost the same size as the real image. In such case, similar lines in the close proximity of each borderline of the real image are superimposed at the object plane, so that the visibility of the real image is largely worsened.

Based on the principle set forth above, when the structure of the observation targets is relatively large and the phase of the complex wavefront diffracted by the low-frequency grating (hereinafter low-frequency component; and a complex wavefront diffracted by the high-frequency grating is also called as high-frequency component) is restored, worsening of visibility of the real image can be suppressed.

Figure 8:
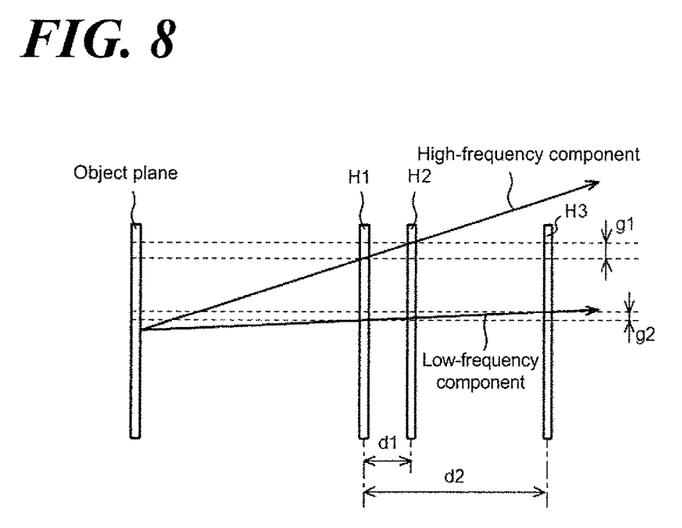
FIG. 8 is an explanation view illustrating that the light path is different between the high-frequency component and the low-frequency component, which is needed for phase restoration.

Here, the inventors sets forth a wavelength condition of the illumination light to restore the phase of the low-frequency component. Referring to FIG. 8, the diffraction angle of the low-frequency component is small compared to the high-frequency component, so that a shift length of the interference pattern due to diffraction is insubstantial when the difference of the light path between the detection planes H1 and H2 (d1 in FIG. 8). (Referring to FIG. 8, the shift length at d1 of the low-frequency component is too little to depict in FIG. compared to the shift length g1 in accordance with the high-frequency component). Under such condition, relative to the low-frequency component, the difference between two holograms imaged at the detection planes H1 and H2 hardly appears, so that the phase restoration can be difficult. Therefore, referring to FIG. 8, the light path difference between the detection planes H1 and H3 (d2 in FIG. 8) can be made long to increase the shift length (g2 relative to d2 in FIG. 8) of the interference pattern so that the phase of the low-frequency component can be easily restored.

Specifically, it can be deemed that the plurality of detection planes is schematically illustrating the detection planes at the same location at which the illumination lights having a different wavelength are detected respectively; and the detection plane close to the object plane corresponds to the short-wavelength and the detection plane far therefrom corresponds to the long-wavelength. The light path difference $\Delta z_{AB}$ that emerges, when two wavelengths $\lambda_A$ and $\lambda_B$ ($\lambda_A < \lambda_B$) are applied, is given by the following mathematical formula (3). The z is the propagation distance as well as in the mathematical formula 1.

Mathematical Formula (3)

$$\Delta z_{AB} = z \times \left(\frac{\lambda_B}{\lambda_A} - 1\right) \quad (3)$$

According to the above mathematical formula 3, the larger the difference between the two wavelengths $\lambda_A$ and $\lambda_B$ is, the larger the light path difference $\Delta z_{AB}$ is, so that the phase restoration of the low-frequency component can be facilitated.

Referring to FIG. 7A, the larger the expansion of the wavefront of the conjugate image reconstructed on the object plane is, the lesser the effect on visibility of the corresponding real image is. Subsequently, the inventor sets forth the case when the structure of the observation target corresponds to the grating having the pitch width $p_{lim}$. This time, given the effect on visibility of the superimposing real image is small enough if the wavefront of the conjugate image on the object plane is more than X times as large as the pitch width $p_{lim}$, the following mathematical formula 4 is obtained from the mathematical formula 2. In addition, the 2z is twice of the propagation distance z and corresponds to the distance from the calculated location of the conjugate image to the object plane.

Mathematical Formula (4)

$$2z \times \tan\left(\sin^{-1} \frac{\lambda}{p_{lim}}\right) \approx 2z \times \frac{\lambda}{p_{lim}} = p_{lim} X \quad (4)$$

Further, the mathematical formula 5 is given by the mathematical formula 4.

Mathematical Formula 5

$$p_{lim} = \sqrt{\frac{2z \times \lambda}{X}} \quad (5)$$

Specifically, the phase of the component corresponds to the grating having the pitch width plim satisfying the above mathematical formula 5 should be restored. In addition, as set forth referring to FIG. 7A, FIG. 7B, the conjugate image having the fine structure expands larger than the conjugate image having rough structure, so that the effect of the high-frequency component having the narrower pitch width p than $p_{lim}$ can be deemed smaller if the phase of the component corresponding to the grating of the observation target $p_{lim}$ is restored.

In addition, when the holograms are imaged at two wavelengths $\lambda_A$, $\lambda_B$ and the two interference patterns shift to just half width of the pitch width $p_{lim}$, the difference between the holograms is most remarkable, i.e., the phase restoration of the component corresponding to the pitch width $p_{lim}$ can be facilitated. Accordingly, the below mathematical formula 6 is given by the mathematical formula (2) and the mathematical formula (3).

Mathematical Formula (6)

$$\Delta z_{AB} \times \tan\left(\sin^{-1} \frac{\lambda}{p_{lim}}\right) \approx \Delta z_{AB} \times \frac{\lambda}{p_{lim}} = z \times \left(\frac{\lambda_B}{\lambda_A} - 1\right) \times \frac{\lambda}{p_{lim}} = \frac{p_{lim}}{2} \quad (6)$$

Further, the blow mathematical formula 7 is obtained from the above mathematical formula 6, $\lambda_A, \lambda_B$ satisfying the mathematical formula 7 is the adequate wavelength of the illumination light to restore the phase of the component corresponding to $p_{lim}$.

Mathematical Formula (7)

$$\frac{\lambda_B}{\lambda_A} = \frac{p_{lim}^2}{2\lambda z} + 1 \quad (7)$$

Accordingly, the below mathematical formula 8 is given by the mathematical formula 5 and the mathematical formula 7.

Mathematical Formula (8)

$$\frac{\lambda_B}{\lambda_A} = \frac{1}{X} + 1 \quad (8)$$

A digital holography device according to the present invention for solving the above problems based on the principles set forth above comprises: a) a light source that emits a coherent light; b) a detector that images a hologram, which is a interference pattern of an object beam and a reference beam due to the emitted light from the light source; and c) a wavelength setting means that specifies plurality of wavelengths of the illumination light, which generates a hologram being imaged by the detector; wherein the wavelength setting means specifies the plurality of wavelength, which are set up by the wavelength setting means based on a magnification percentage X set up by a user not to disturb visibility thereof when a real image reconstructed by the preset calculation means and the conjugate image relative to a structure of the observation targets so that the shortest wavelength $\lambda_{min}$ and the longest wavelength $\lambda_{max}$ can satisfy:

Mathematical Formula (9)

$$\lambda_{max}/\lambda_{min} \geq (1/X+1) \qquad (9)$$

In addition, "not disturb the visibility of the superimposed real image" means, i.e., the particularly noticeable borderline (edge) in the real image is unequivocal. For example, when the shape of the superimposing conjugate image in the proximity of the edge of the real image is largely different and both can be clearly distinguished, the conjugate image is deemed not disturbing visibility of the real image.

According to the structure as set forth above, the detector images a hologram, which is a interference pattern of a object beam due to the emitted coherent light from the light source and a reference beam. Subsequently, the above wavelength setting means that specifies the above plurality of wavelengths specifies the plurality of the wavelengths as the shortest wavelength $\lambda_{min}$ and the longest wavelength $\lambda_{max}$ satisfy the above expression.

The relational expression is obtained from the mathematical formula 8. As set forth above, the mathematical formula 8, when the observation target is the structure corresponding to the diffraction grating having the pitch width $p_{lim}$ if the magnification percentage of the conjugate image is X that does not worse the visibility of the real image (such value of magnification percentage X of the conjugate image is defined by the above finding while the user is considering the characteristics of the observation targets and provided to the device of the present invention), the proportion of the illumination light wavelengths $\lambda_A$ and $\lambda_B$ ($\lambda_A < \lambda_B$) is defined. Accordingly, if the ratio of the shortest wavelength $\lambda_{min}$ and the longest wavelength $\lambda_{max}$, which are defined by the wavelength setting means, satisfy the above relationship expression 9, the degree of accuracy of the phase restoration relative to the structure of the observation target can be improved. In addition, even if the residual conjugate image superimposes the real image without restoring the phase, the conjugate image is enlarged more than X times as large as the real image, so that visibility of the real image may not be disturbed. Consequently, the clear image can be obtained even relative to relatively large observation target such as a cell colony. In addition, calculation of the phase information can be performed by the calculation means installed to the digital holography device or by an external computer for the control and analysis connected to the digital holography device.

Relative to the above "a plurality of wavelengths", it can be arbitrarily decided by depending on a hardware, a calculation cost and a quality of image and so forth how many kinds of wavelength are used. When the number of wavelengths being used increases, the calculation cost thereof increases but the phase in much broader frequency domain can be restored.

In addition, the wavelength setting means of the present invention can be one of functions subject to the light source or can be operative in the detector-side. The typical example of the former is the light source that can change the wavelength of the outgoing beam and one example of the latter can be a structure in which the detector is made of the hyperspectral camera and images of a plurality of wavelengths are individually extracted from the image that is imaged. Further, as another example, an installed switching element connected to a plurality of light sources through such as an optical fiber and so forth may switch the outgoing beam from any one of light sources to be irradiated to the object.

A digital holography device according to the second invention for solving the above problems based on the principles set forth above comprises: a) a light source that emits a coherent light; b) a detector that images a hologram, which is an interference pattern of an object beam and a reference beam due to the outgoing beam from the light source; and c) a wavelength setting means that sets up a plurality of wavelengths of the illumination light, which generates a hologram being imaged by the detector; wherein the wavelength setting means that specifies the plurality of wavelengths as the shortest wavelength $\lambda$min and the longest wavelength $\lambda_{max}$ satisfy an expression Mathematical formula (10).

Mathematical Formula (10)

$$\lambda_{max}/\lambda_{min} \geq 1.3 \qquad (10)$$

The above value corresponds to the case in which the area of the conjugate image is 10 times as large as the real image. Given the area ratio between the conjugate image and the real image is somewhat in such range, it is found that the visibility of the real image was satisfactory based on the results of the simulation performed by the inventor per se. At this time, $\sqrt{X}$ is approximately 0.3 and the left-hand member of the expression 9 is approximately 1.3, so that the above expression can be obtained.

As a preferable aspect, the wavelength setting means specifies the shortest wavelength $\lambda_{min}$ and the longest wavelength $\lambda_{max}$ to satisfy the following expression.

Mathematical Formula (11)

$$1.3 \leq \lambda_{max}/\lambda_{min} \leq 2.0 \qquad (11)$$

As represented by the mathematical formula 3, the larger the difference between $\lambda_{min}$ and $\lambda_{max}$ is, the easier the phase restoration of the low-frequency component is in theory, but such effect is a trade-off for the degree of accuracy of the phase restoration of the high-frequency component beyond a constant level. Specifically, referring to FIG. 8, if the difference between the wavelengths is large, a part of diffraction beam is going out of the detect plane, e.g., as the high-frequency component in FIG. 8 relative to the detection plane H3, so that the degree of accuracy of the phase restoration can be dropped, accordingly. Therefore, the following criteria are adopted to determine an appropriate upper limit value of the ratio between the two wavelengths. Specifically, if the light path length difference $\Delta z$ between $\lambda_{min}$ and $\lambda_{max}$ is equal to the propagation distance z, the phase restoration of the low-frequency component is deemed satisfactory. According to the mathematical formula 3, $\lambda_{max}/\lambda_{min}=2.0$ is appropriate as the upper limit value.

A method of generation of a digital hologram according to the third invention for solving the above problems based on the principles set forth above comprises steps of: a) emitting a coherent light from a light source; b) imaging a hologram that is a interference pattern of an object beam and a reference beam due to the emitted light from the light source by a detector; and c) specifying a plurality of wavelengths of the illumination light that generates a hologram being imaged by the detector; wherein the plurality of wavelength is specified by the wavelength specifying step based on a magnification percentage X set up by a user not to disturb visibility thereof when a real image reconstructed by the preset calculation means and the conjugate image relative to a structure of the observation targets Mathematical Formula 12

$$\lambda_{max}/\lambda_{min} \geq (1/X+1) \quad (12)$$

Even in such case, eventually if

Mathematical Formula 13

$$1.3 \leq \lambda_{max}/\lambda_{min} \leq 2.0 \quad (13)$$

is given, restoration of the satisfactorily clear real image can be accomplished.

In addition, relative to the digital holography device or the method of generation of digital hologram, specifying a plurality of the wavelengths as follows: $1.3 \leq \lambda_{max}/\lambda_{min} \leq 2.0$, is useful in a phase unwrapping method.

Specifically, in the phase unwrapping method generating a long pseudo-wavelength phase image from the phase image of the two wavelengths λA,λB, pseudo-wavelength λAB is calculated by the following mathematical formula.

Mathematical Formula (14)

$$\lambda_{AB}=(\lambda_A \times \lambda_B)/(\lambda_B-\lambda_A)=\lambda_B/(\lambda_B/\lambda_A-1) \quad (14)$$

Figure 9:
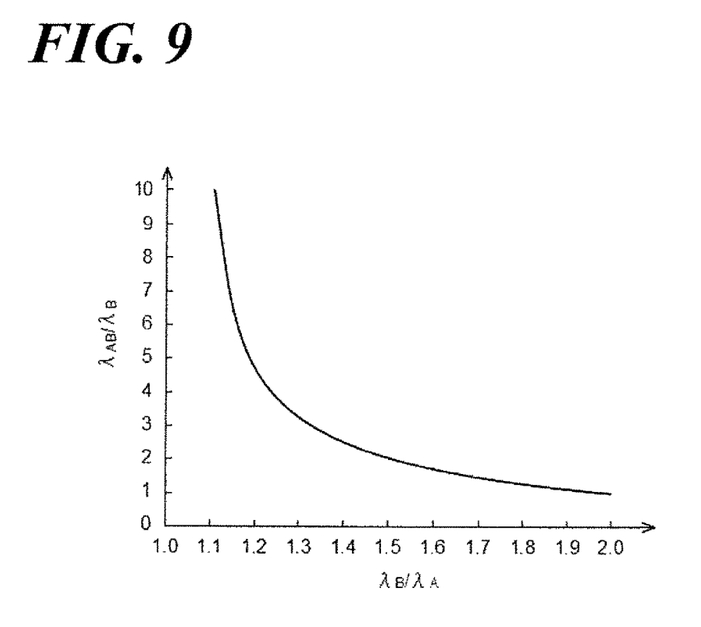
FIG. 9 is a graph illustrating a relationship between the original wavelengths $\lambda_A$, $\lambda_B$ and the combined wavelength $\lambda_{AB}$ relative to the phase unwrapping.

When the pseudo-wavelength $\lambda_{AB}$ becomes big, the phase image can be displayed without a fold of the phase as an advantage, but the resolution of the phase decreases as a disadvantage. Therefore, it is preferable to select appropriate wavelengths $\lambda_A$, $\lambda_B$ in accordance with the phase range of the object. Referring to FIG. 9, the relationship between both wavelengths $\lambda_A$, $\lambda_B(\lambda_B/\lambda_A)$ and the wavelength $\lambda_{AB}$ after combined is illustrated and when $\lambda_B/\lambda_A=1(\lambda_A=\lambda_B)$ is given, $\lambda_{AB}$ diverges infinitely, and if $\lambda_B/\lambda_A=2$ is given, $(\lambda_B=2\times\lambda_A)$, $\lambda_{AB}=\lambda_B$ is obtained and the wavelength becomes the same as before combined.

Accordingly, as set forth above, specifying the plurality of the wavelengths as $$1.3 \leq \lambda_{max}/\lambda_{min} \leq 2.0$$

is an adequate condition when applying the phase unwrapping method.

Effect of the Invention

According to the aspect of the present invention, relative to the observation target having different structures therein, a clear image relative to the target structure can be reconstructed.

For example, relative to observation of the cell colony, aggregation of cells, when defect of cells per se and so forth, relatively large object, is imaged (observed), provided the ratio between the maximum value and the minimum values of the applied wavelengths is bigger than 1.3, a relatively clear image relative to the target structure thereof can be obtained.

In addition, the method according to the aspect of the present invention can be used even when the phase unwrapping method is applied.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Figure 1:
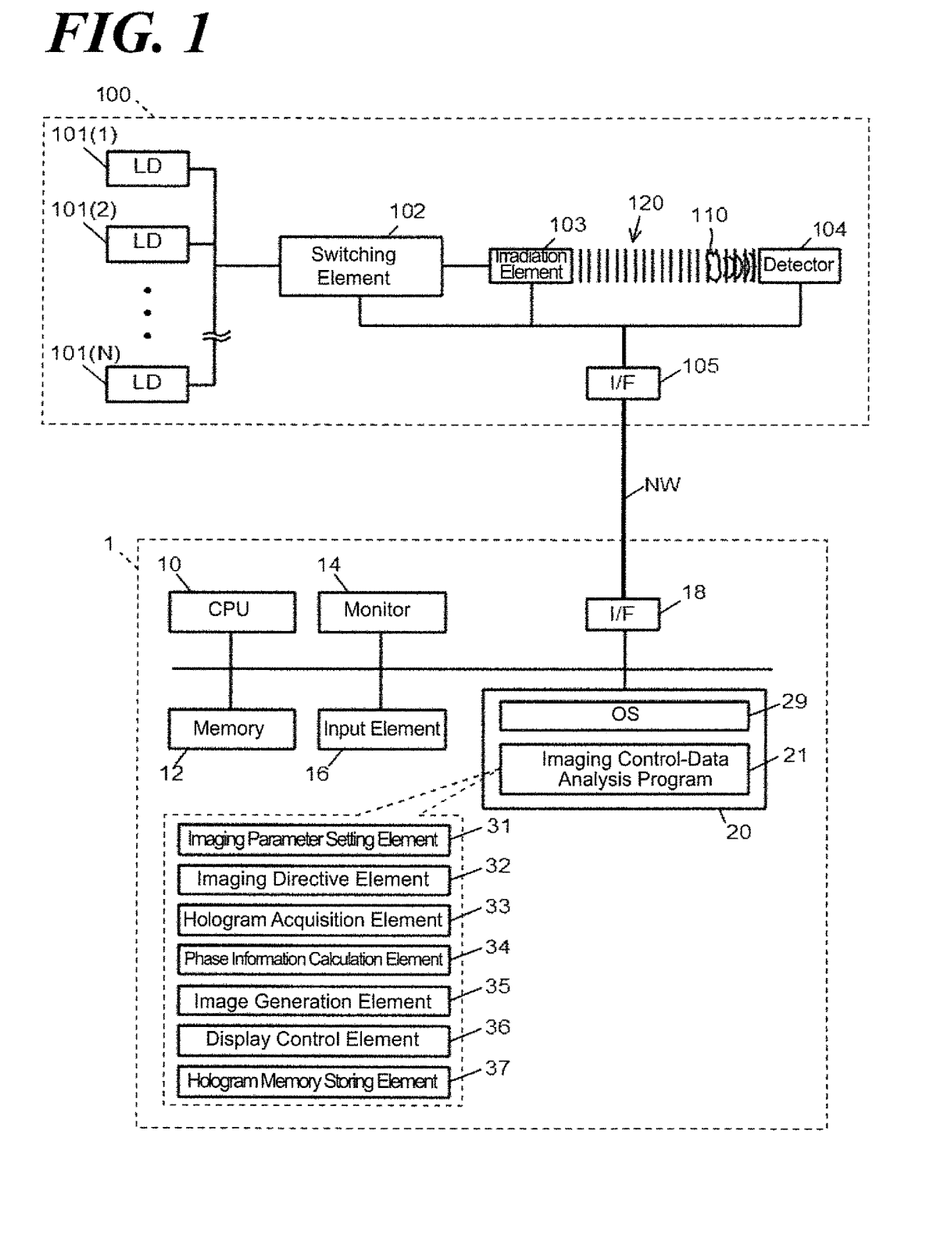
FIG. 1 is a schematic block diagram illustrating a measurement system comprising a digital holography device according to the aspect of the Embodiment of the present invention.

FIG. 1 is a schematic block diagram illustrating a measurement system comprising a digital holography device according to the aspect of the Embodiment of the present invention. The measurement system comprises a digital holography device 100, a workstation 1 that is communicably connected to the digital holography device 100.

[Structure of the Digital Holography Device 100]

The digital holography device 100 that is a microscope comprises the number N of laser diode (LD) 101(1)-101(N), a switching element 102 (corresponds to the wavelength setting means of the present invention), an irradiation element 103, a detector 104 and an interface (I/F) 105.

Any LD101(1)-101(N) is a light source that oscillates and emits coherent beam and oscillation wavelengths $\lambda 1$-$\lambda N$ thereof are specified to be longer in order. Such LD101(1)-101(N) are connected to the switching element 102 via an optical fiber.

The switching element 102 switches the LD101(1)-101(N), which is used as the light source of the illumination light 120, according to the directive from the workstation 1.

The irradiation element 103 irradiates the illumination light 120, as specified above, toward the object 110. In addition, in a practical measurement, the illumination light 120 passes through the (culture) plate and culture medium other than the object 110, so such components should be also made of light transmissive material.

The detector 104 images the interference pattern due to the illumination light 120 emitted from the irradiation element 103 as a hologram. The hologram is a record of the interference pattern emerging from the object beam (arc lines depicted in the right-side of the object 110 in FIG. 1) which is the light wave diffracted by the object 110 and the reference wave (straight lines in the right-side of the object 110) which is the not-diffracted light wave (including transmitted light). The detector 104 can be brought into reality by e.g., CCD (charge-coupled devices) image sensor.

(Structure of the Workstation 1)

The workstation 1 is practically a true computer comprising a CPU central processing unit) connecting a memory 12, a monitor made of LCD (liquid crystal display) and so forth, an input element 16 including a mouse and a memory storing element 20 each other. Subsequently, the above memory comprises a volatile memory such as RAM (access memory), and the memory storing element 20 comprises non-volatile memory such as a ROM (read only memory), a flash memory, a EPROM (erasable programmable ROM), EEPROM® (electrically EPROM), a HDD (hard disc drive), a SSD (solid state drive) and so forth. An imaging control-data analysis program 21 is installed to the memory storing element 20. Each element that the imaging control-data analysis program 21 comprises is a feasible functional means when CPU 10 reads out the program into the memory 12 and execute. In addition, the memory storing element 20 stores OS (operating system) 29.

The workstation 1 comprises an interface (I/F) 18 that is operative to connect directly to the outside devices and to the outside devices through a network such as a LAN (local area network), and connects to the digital holography device 100 through the network cable NW (or wireless LAN) from I/F18. In addition, the workstation 1 can connect multiple digital holography devices 100. In addition, the workstation 1 can connect directly multiple digital holography devices 100 via USB cable and so forth.

The imaging control-data analysis program 21 is an application software for controlling imaging by the digital holography device 100, reconstructing the image of the object 110 by the predetermined operation processing based on the imaged hologram, and displaying the reconstructed image on the monitor 14 as an image.

Referring to FIG. 1, in accordance with the imaging control-data analysis program 21, the imaging parameter setting element 31, the imaging directive element 32, the hologram acquisition element 33, the phase information calculation element 34, the image generation element 35, the display control element 36 and the hologram memory storing element 37. In addition, the imaging control-data analysis program 21 needs not always be a simplex program, and can be a functional part of elements of the digital holography device 100.

[Processing Flow in the Measurement System]

Figure 3:
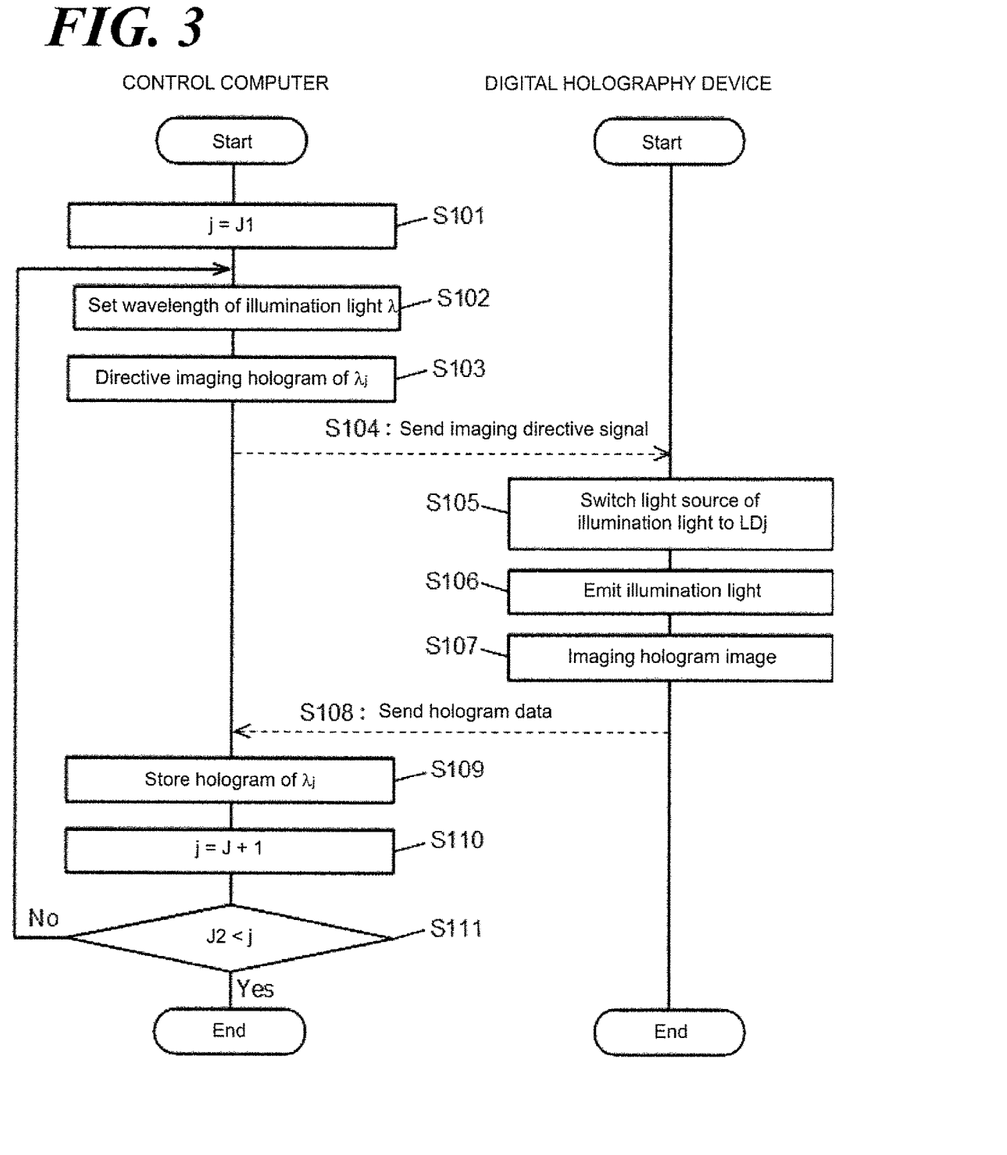
FIG. 3 is a flow-chart illustrating an example of the hologram imaging processing.

Referring to FIG. 2-FIG. 4, hereinafter, the inventor sets forth a flow of the processings executed by the measurement system including the digital holography device 100 according to the aspect of the present Embodiment.

First, referring to FIG. 2, the inventor sets forth the flow of the basic processings executed by the imaging control-data analysis program 21. Once the imaging control-data analysis program 21 starts, the user first is requested to input the value of the central wavelength $\lambda_{mid}$ of the hologram imaging. The input value of the central wavelength $\lambda_{mid}$ can be not only an arbitrary input value, but also any selected value of the number N of LD101(1)-101(N) pre-installed to the digital holography device 100 of the present invention. Once the user inputs the central wavelength $\lambda_{mid}$ through the input element 16 (Step S11), the imaging control-data analysis program 21 requests, subsequently, to input the value of the area magnification ratio $X^2$ of the conjugate image (magnification percentage X). Similarly, not only an arbitrarily value can be input, but also the value can be selected from the list of the pre-registered values displayed on the monitor 14. Once the user inputs the value of the area magnification ratio $X^2$ (or magnification percentage X) through the input element 16 (Step S12), the imaging parameter setting element 31 of the imaging control-data analysis program 21 selects a plurality of the LD light sources from the LD101(1)-101(N) as the central wavelength $\lambda_{mid}$ to satisfy the above expression 9. Specifically, if the selected light sources are LD101(J1)-101(J2), the wavelength $\lambda_{J1}$ of LD101(J1)-wavelength $\lambda_{J2}$ LD101(K2) satisfies $$\lambda_{J2}/\lambda_{J1} \geq 1/X+1,$$

$$\text{average}(\lambda_{J1}, \ldots, \lambda_{J2}) \approx \lambda_{mid}.$$

According to the aspect of the present Embodiment, the object 110 of the imaging target is a colony of the induced pluripotent stem cell such as ES cells and iPS cells and so forth. And the inventor sets forth as given the value of the area magnification ratio $X^2$ of the conjugate image is 10 ($\sqrt{10}$ as magnification percentage). The reason for the decision is that when the object 110 of the observation targets is the cell colony, the area between the real image and the superimposed conjugate image thereon, which is approximately 10 times as large as the real image, can be satisfactory to provide the clear shape-image based on the result of a preliminary experiment. On the other hand, if the difference between the shortest wavelength $\lambda$min and the longest wavelength $\lambda_{max}$ is too big, as set forth before, a part of the diffracted light is going out of the detection plane, so that such incident can be an factor to lessen the degree of accuracy of phase restoration. The imaging parameter setting element 31 selects the light source LD101(J1)-101(J2) giving the expression of $1.3(=1/\sqrt{10}+1) \leq \lambda_{max}/\lambda_{min} = \lambda_{J2}/\lambda_{J1} \leq 2.0$ at the step S13 under considering such conditions. In addition, the wavelength input by the user at the above step can be the shortest wavelength λmin or the longest wavelength $\lambda_{max}$ instead of the central wavelength $\lambda_{mid}$. In addition, in the case of cell observation, a visible region (approximately 600 nm) is appropriate to avoid a low wavelength region concerned about a toxicological effect or a far-infrared region concerned about heat generation due to absorption of light, but such value is not particularly an issue in regard to the below explanation.

In such way, a hologram imaging processing is executed (Step S14) following section of the light source to be used. Referring to FIG. 3, the inventor set forth further detail of the above step.

First of all, j=J1 (J1≤j≤J2) is given (Step S101) and the imaging parameter setting element 31 specifies the wavelength of the illumination light 120 (referring to FIG. 1) emitted from the irradiation element 103 as λj (Step S102). Subsequently, the imaging directive element 32 directs the digital holography device 100 to image a hologram image of λj (Step S103). The above directive by the imaging directive element 32 is sent to an I/F105 of the digital holography device 100 from the I/F18 as the imaging directive signal (Step S104).

Once the I/F105 installed to the digital holography device 100 receives the above imaging directive signal, the switching element 102 switched the light source for the illumination light 120 to the number j of LD101(j) (Step S105). Subsequently, the irradiation element 103 irradiates the illumination light 120 toward the object 110 (Step S106). Then, the interference pattern between the diffracted object beam by the object 110 and the non-diffracted reference wave is imaged by the detector 104 (Step S107). The imaged hologram data is sent to the I/F18 of the workstation 1 via I/F/105 (Step 108).

Once the I/F18 installed to the workstation 1 receives the above hologram data, the hologram acquisition element 33 acquires the received hologram data and stores in the hologram memory storing element 37 (Step S109). The hologram memory storing element 37 collectively stores a plurality of hologram data (J2−J1+1 according to the aspect of the present Embodiment) applied for the phase information calculation processing, set forth later, and reconstruction of the object image every measurement targets designated by the user.

Once the hologram data is stored, the imaging parameter setting element 31, subsequently, increments j (Step S110) and unless the value j is beyond the maximum value J2 (Step 111), the processing turns back to right before the Step 102 and then the steps S102-S111 are executed relative to the next wavelength $\lambda_j$.

On the other hand, following the incrementation result at the step S110, if j is bigger than j2 (Yes at Step 111), such decision means that the hologram data corresponding to all light wavelengths between $\lambda_{J1}$-$\lambda_{J2}$ set up at the step S100 are in order.

Referring to FIG. 2 again, once the hologram imaging processing (Step S14) in such way is completed, the phase information calculation element 34 subsequently executes the phase information calculation processing to the respective hologram data (Step S15). The inventor sets forth the detail of the processing at the present step later referring to FIG. 4.

Once the phase is restored relative to each hologram data at the step S15, the image generation element 35 reconstructs the object image based on the hologram data following such phase restoration (Step S16). The reconstructed object image (hereafter reconstructed image) is displayed on the monitor 14 by the display control element 36 (Step S17). At this point, the general processings due to the measurement system complete.

(Flow of the Phase Information Calculation Processing]

Referring to FIG. 4, one example of the flow of phase information calculation processing at the above step S15 is illustrated. Such phase information calculation processing is executed based on the number (J2−J1+1) of the hologram data stored in the hologram memory storing element 37 at the step 109.

First, the phase information calculation element 34 converts each hologram to an amplitude image (Step 201). The hologram that is a distribution of intensity values, so the hologram cannot be applied to a Fourier transform used in the propagation calculation set forth later. Therefore, each intensity value is converted to an amplitude value at the present step. The conversion to the amplitude image is performed by calculation of the square root of each pixel value.

Subsequently, the phase information calculation element 34 specifies a default value of the phase image at the detection plane as j=1, a=1, n=1. The default value of the phase image can be arbitrarily and, for example, all pixel values can be specified as null or each pixel value can be specified randomly. In addition, j (1≤j≤J2) is a discriminator of LD101, which is the light source of the illumination light 120, as well as set forth above, a is a direction value having either 1 or −1, and n (1≤n) is the repetition number of the operation.

Subsequently, the phase information calculation element 34 updates the amplitude image of $\lambda_j$ (Step S203). Specifically, the amplitude image obtained by the conversion of the intensity value at the step S201 is substituted. According to the processing referring to FIG. 4, an expression of "update" corresponding to the update of j is used, but if j=j1 is given, the expression of "substitute" is likely more appropriate.

Subsequently, the phase information calculation element 34 calculates a reverse propagation to the object plane (Step S204).

Subsequently, the phase information calculation element 34 determines whether or not a value of j+a is in the range of J1-J2 (Step S205). Here, given the value of J2 is 5, the value of j+a is 2 at the first test, so that the decision is "Yes" at the step S205 and consequently the j is incremented (Step S207). In such way, when the repetition of increment results in 5, specifically, J equals to J2, j+1 is 6 that is over J2, so that decision at the step S205 results in "No". At such stage, the phase information calculation element 34 reverses plus and minus of a (Step S206) and decrements j (Step S207). If the value of j decreases until 1 due to repetition of the decrement at the step S207, the decision at the step S205 results in "No", so that plus and minus of a reverse again at the step S2067. Consequently, according to the present flow-chart, the reverse of plus and minus of a is repeated followed by reverse repetition of increment and decrement.

As set forth above, when J=1, j is incremented to give 2 at the step S207. Subsequently, the phase information calculation element 34 updates the phase of the object beam due to $\lambda_j$ (Step S208). Specifically, relative to the complex wavefront relative to the object plane calculated at the step S204, the phase is converted to the next wavelength (without updating the amplitude). In such way, under the condition in which only the phase is converted to the next wavelength, propagation to the detection plane is calculated (Step S209), and when the sum of differences (i.e., errors) between the calculation result and the actual measurement value, which is the square root of each intensity value of the hologram, is bigger than the threshold value ε ("No" at the step S210), the phase information calculation element 34 increments n (Step S221) and repeats the above processings.

On the other hand, if the sum of errors is smaller than the threshold value ε ("Yes" at the step S210), the phase information calculation element 34 deems that the satisfactory phase restoration is obtained and ends the phase information calculation processing.

Figure 5:
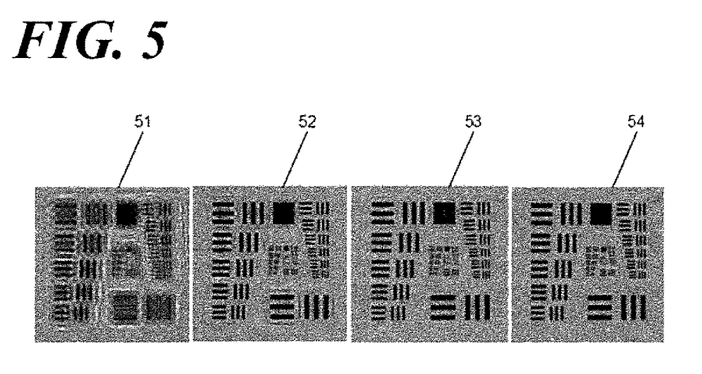
FIG. 5 is simulation results of an object image of an observation target having a variety of sizes, which is reconstructed by the measurement system referring to FIG. 1.

Simulation results of the object images that are reconstructed according to the above method are illustrated in FIG. 5. All images are simulation results of phase restoration and reverse propagation using the USAF chart hologram model, and the simulation result 51 is illustrating the case when the reverse propagation (400 nm) takes place without phase restoration; the simulation result 52 is illustrating the case when the phase is restored at 400 nm and 520 nm ($\lambda_{max}/\lambda_{min}=1.3$) and the reverse propagation takes place with phase restoration; the simulation result 53 is illustrating the case when the phase is restored at 400 nm and 800 nm ($\lambda_{max}/\lambda_{min}=2.0$) and the reverse propagation takes place with phase restoration; and the simulation result 54 is illustrating the case when the phase is restored at 400 nm, 520 nm and 800 nm ($\lambda_{max}/\lambda_{min}=2.0$, and at three wavelengths) and the reverse propagation takes place with phase restoration. When $\lambda_{max}/\lambda_{min} \geq 1.3$ is given, an remarkable phase restoration is observed. In addition, a positive effect due to increase of the number of wavelengths within such range is found.

Alternative Embodiment

According to the aspect of the Embodiment as set forth above, adequate light sources LD101(J1)-101(J2) from a number of laser diodes LD101(1)-101(N) corresponding to the central wavelength $\lambda_{mid}$ (or the longest wavelength $\lambda_{max}$ or the shortest wavelength $\lambda_{min}$) and the magnification percentage X input by the user are selected and used by switching the light sources, but such setting of freedom is not required and when an imaging (observation) target is pre-determined, only a plurality of light sources pre-registered according to the expression 9 is installed to the digital holography device 100 and only such light sources are allowed to be employed. In such scenario, the number of light sources (number of wavelengths) are set to 2 so that the calculation time is shortened, and when such defect of the cell colony and so forth is examined as set forth above, practically and satisfactorily clear image reconstruction can be accomplished.

REFERENCE OF SIGNS

10 FPD
12 Memory
14 Monitor
16 Input element
18 I/F
20 Memory element
21 Imaging control-data analysis program
31 Imaging parameter setting element
32 Imaging directive element
33 Hologram acquisition element
34 Phase information calculation element
35 Image generation element
36 Display control element
37 Hologram memory storing element
100 Digital holography device
101(1)-101(N) Laser diode (LD)
102 Switching element
103 Irradiation element
104 Detector
105 I/F
110 Object
120 Illumination light It will be further understood by those of skill in the art that the apparatus and devices and the elements herein, without limitation, and including the sub components such as operational structures, circuits, communication pathways, and related elements, control elements of all kinds, display circuits and display systems and elements, any necessary driving elements, inputs, circuits, sensors, detectors, memory elements, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related digital holography devices and generation methods for the same, including, computer and operational controls and technologies of radiographic devices and all their sub components, including various circuits and combinations of circuits without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A digital holography device comprising:
a) a light source that emits a coherent light;
b) a detector that images a hologram that is an interference pattern of an object beam and a reference beam due to emitted light from said light source; and
c) a wavelength setting means that sets up a plurality of wavelengths of an illumination light to generate a hologram being imaged by said detector;
wherein the wavelength setting means specifies the plurality of wavelength, which are set up by the wavelength setting means based on a magnification percentage X set up by a user not to disturb a visibility thereof when a real image reconstructed by the preset calculation means and the conjugate image relative to a structure of the observation targets so that a shortest wavelength $\lambda_{min}$ and a longest wavelength $\lambda_{max}$ satisfy an expression $\lambda_{max}/\lambda_{min} \geq (1/X+1)$.

2. The digital holography device, according to claim 1, wherein:
said wavelength setting means is a switching element connected to a plurality of said light sources through an optical fiber and is used by switching the connected plurality of light sources.

3. A method of generation of a digital hologram, comprising steps of:
a) emitting a coherent light from a light source;
b) imaging a hologram that is an interference pattern of an object beam and a reference beam due to emitted lights from said light source by a detector; and
c) specifying a plurality of wavelengths of illumination lights that generate a hologram being imaged by the detector;
wherein the plurality of wavelength is specified by the wavelength specifying step based on a magnification percentage X set up by a user not to disturb a visibility thereof when a real image reconstructed by the preset calculation means and the conjugate image relative to a structure of the observation targets so that a shortest wavelength $\lambda_{min}$ and a longest wavelength $\lambda_{max}$ satisfy an expression $\lambda_{max}/\lambda_{min} \geq (1/X+1)$.

* * * * *